(12) United States Patent
Stark

(10) Patent No.: US 7,270,106 B2
(45) Date of Patent: Sep. 18, 2007

(54) FREE-PLANETARY GEAR MODERATED NUTATING (ATHENA) ENGINE

(76) Inventor: John Stark, 455 Ocean Pky. (Apt. 7-D), Brooklyn, NY (US) 11218

( * ) Notice: Subject to any disclaimer, the term of this patent is extended or adjusted under 35 U.S.C. 154(b) by 7 days.

(21) Appl. No.: 11/159,092

(22) Filed: Jun. 23, 2005

(65) Prior Publication Data

US 2006/0288977 A1   Dec. 28, 2006

(51) Int. Cl.
| F02B 53/00 | (2006.01) |
| F01C 1/00 | (2006.01) |
| F01C 1/063 | (2006.01) |
| F04C 2/00 | (2006.01) |
| F04C 18/00 | (2006.01) |
| F04C 5/00 | (2006.01) |
| F04C 3/00 | (2006.01) |
| F16N 13/20 | (2006.01) |

(52) U.S. Cl. .................. 123/241; 418/48; 418/49; 418/51; 418/53; 418/68

(58) Field of Classification Search ............... 123/241; 418/228, 48, 49, 51, 53

See application file for complete search history.

(56) References Cited

U.S. PATENT DOCUMENTS

| 1,136,976 A | * | 4/1915 | Reaugh ................. 418/226 |
| 1,182,033 A | * | 5/1916 | Peenink ................. 418/53 |
| 3,667,876 A | * | 6/1972 | Boyd .................... 418/68 |
| 3,935,750 A | * | 2/1976 | Maroth .................. 74/61 |
| 4,877,379 A | * | 10/1989 | Okabe .................. 418/53 |
| 5,251,594 A | | 10/1993 | Meyer .................. 123/228 |
| 5,336,067 A | | 8/1994 | Lim ..................... 123/241 |
| 5,419,292 A | * | 5/1995 | Antonov ................ 123/241 |
| 6,325,038 B1 | | 12/2001 | Millett ................. 123/241 |

FOREIGN PATENT DOCUMENTS

DE   3502734 A1  *  11/1986   ................ 418/49

* cited by examiner

*Primary Examiner*—Thai-Ba Trieu

(57) ABSTRACT

In a nutating engine (or more generally a rotary displacement device) the cycling of combustion occurs between inner and outer spherical surfaces. The combustion chambers are additionally defined only by the surfaces of teeth of specially designed gears. These gears are the Rotator (2), two consecutive of some number of free-planetary gears (3A-E), and the lobed Nutating Member (1). The latter is enjoined to execute precessional rotation relative to the former and maybe both affixed with counterweights (11A,B; 12A,B) and subjected to reverse-English transforming the precessional rotation to a stress-free mode in both the Newtonian and Eulerian sense. The insertion of optional butterfly-shaped plugs (4A-E, 5A-E, 8A-E) boosts the compression ratio. Truly, no past engine possesses the characteristics of the instant invention.

20 Claims, 7 Drawing Sheets

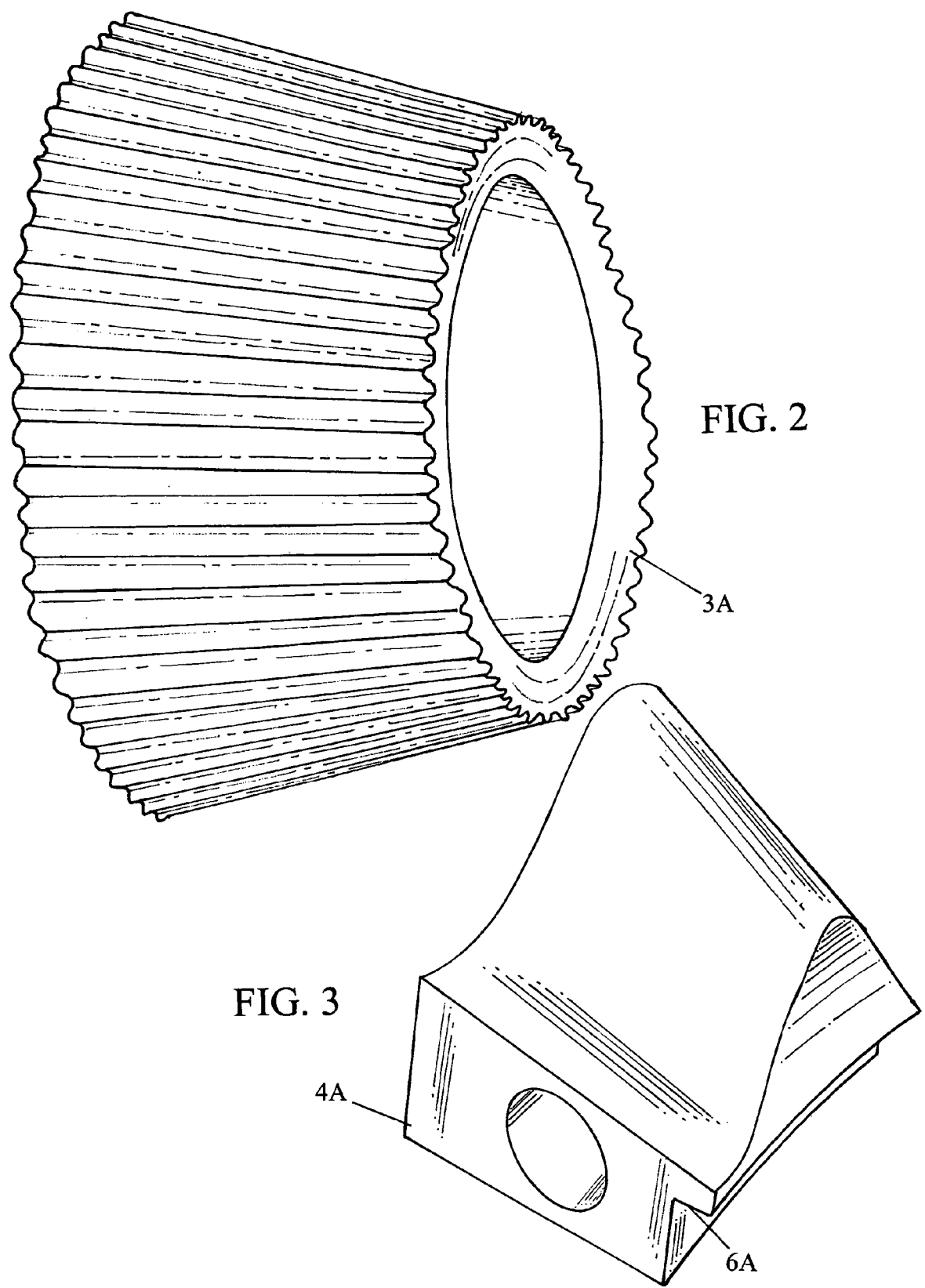

FREE-PLANETARY GEAR MODERATED NUTATING (ATHENA) ENGINE

CROSS REFERENCE TO RELATED APPLICATIONS

Not applicable

FEDERALLY SPONSORED RESEARCH OR DEVELOPMENT

Not applicable

REFERENCE TO SEQUENCE LISTING

Not applicable

BACKGROUND OF THE INVENTION

This invention pertains to certain improvements in rotary internal combustion engines in general and nutating engines in particular.

PRIOR ART

For more than a century engineers have had a dream of replacing the reciprocating piston engine with a rotary piston device. It had been hoped that by so doing the inherently stressful conditions of reciprocation could be obviated providing for a far less massive construction and a smoother action. The effort has met with limited success: the only palpable effort has been the Wankel Drehkolbenmotor which became operational in a commercial sense only after the prodigious effort on the part of metallurgists on three continents. The problem, of course, was the seals.

Another thread of design has been the nutating engine in general and the spherical engine in particular. The hope was that by availing oneself of of the natural motion as analyzed by Leonard Euler in 1760 of a symmetric body, namely the uniform rotation of this body as its axis of rotation simultaneously precesses, i.e., sweeps out a cone shape in three dimensional space, that the aformentioned stressless condition might be realized.

To manifest this idea most efforts have sought to enclose the process within the confines of a spherical cavity. This could immediately nullify the "Newtonian" stress by fixing the center of mass of the main displacement element, i.e. that which is analogous to the piston, at the sphere's center. (The Wankel does not share this benefit.) This relief however comes with a heavy bill to pay: Given that both the spherical cavity and the main displacement member are of constant volume, certainly what remains can not be naively utilized as a combustion chamber for its volume must, throughout the cycling, likewise remain constant.

To allay this predicament, the spherical combustion chamber has, over the century, seen itself partitioned in one way or another, always to Pyrrhic effect:

Typically in Meyer U.S. Pat. No. 5,251,594; Oct. 12, 1993 the partition necessitates the slotting of the main displacement member to the effect of precluding its actual rotation. With this there is no possibility of recovering any kind of hitherto mentioned, natural motion. Additionally the sealing problem is far greater than for even the Wankel.

Millet U.S. Pat. No. 6,325,038 B1; Dec. 4, 2001 cleverly skews the drive shaft at some angle to the combustion chamber axis rendering the chamber amenable to partition. Though the sealing problem is far more tractable than Meyer there is again no rotation of the main displacement element and so no possibility of exploiting a natural motion.

Lim U.S. Pat. No. 5,336,067; Aug. 9, 1994 is a spherical engine of a different nature. By utilizing two sequences of cusps which slide over each other within the spherical cavity he at least holds out the hope for manifesting a simultaneous natural rotation and precession of the main displacement elements though he makes no mention of this. Then, to alleviate wear and tear upon these cusps he introduces vaguely certain cams and cam followers not aware, apparently, of the corresponding loss in seal integrity that that would necessarily occasion.

The instant invention is in some way similar to Lim and in some way its diametric opposite.

BRIEF SUMMARY OF THE INVENTION

I submit a nutating engine in which, between inner and outer concentric spherical surfaces, according to one aspect of the instant invention, a progression of free-planetary gears are engaged with and only with both a substantially circular toothed Rotator as well as a toothed Nutating Member possessing some number of lobes and an equal number of interjacent arches, this number being different by unity to the number of free-planetary gears. In circumnavigating their latitude the phase lag of each free-planetary gear relative to the lobe's nadir subsequent to it will increment uniformly. (increment uniformily, if the number of lobes had been chosen to be 1 less than the number of free-planetary gears; decrement uniformly, if the number of lobes had been chosen to be 1 more than the number of free-planetary gears.) Additionally, all phase lags will advance with advancing time. Thus entrained the Nutating Member will be enjoined to execute perfect geometrical rotations and simultaneous precessions relative to the Rotator.

This motion will occasion the inter-planetary volumes to suffer expansions and contractions thus defining them as combustion chambers.

According to another aspect of the instant invention, the Nutating Member can be counterweighted to relocate its center of mass to that of the sphere whence the entire apparatus be imparted with a reverse-English about the Rotator's axis thus endowing the formerly mere geometrical precession with a natural-physical (as per Euler) character. Adding the observation that both the Rotator and the free-planetary gears describe but circles the overall result is an extremely stress-free, lightweight, easily sealed, and easily milled device. Finally, while the cavitation provided by the gearing will yield a high burn efficiency, the insertion of "butterflies" into the inter-planetary volumes will coax the compression ratio to well within the Diesel regime.

OBJECTS AND ADVANTAGES

The instant invention utilizes not a cusped but a lobed curve called the polaricider which demarcates the Nutating Member, the main displacement element. This plus a Rotator and not fixed cams, but a sequence of free-planetary gears define the combustion chambers.

So, one object of the proposed invention is to lay to rest the sealing problem: the tighter the entrainment of rotating elements the greater the seal integrity.

A much greater object is to render all of the combustion elements with a completely natural, stress-free motion, as will be seen infra. This will allow an unbelievably lightweight construction.

A third object is to reduce wear, tear, and maintenance to levels commensurate with those of electric motors.

Several other objects and advantages will become apparent in the succeeding argument.

BRIEF DESCRIPTION OF THE SEVERAL VIEWS OF THE DRAWINGS

FIG. 2 and FIG. 3 are details of a free-planetary gear and a left "butterfly" wing respectively.

REFERENCE NUMERALS IN DRAWINGS

Figure 1:
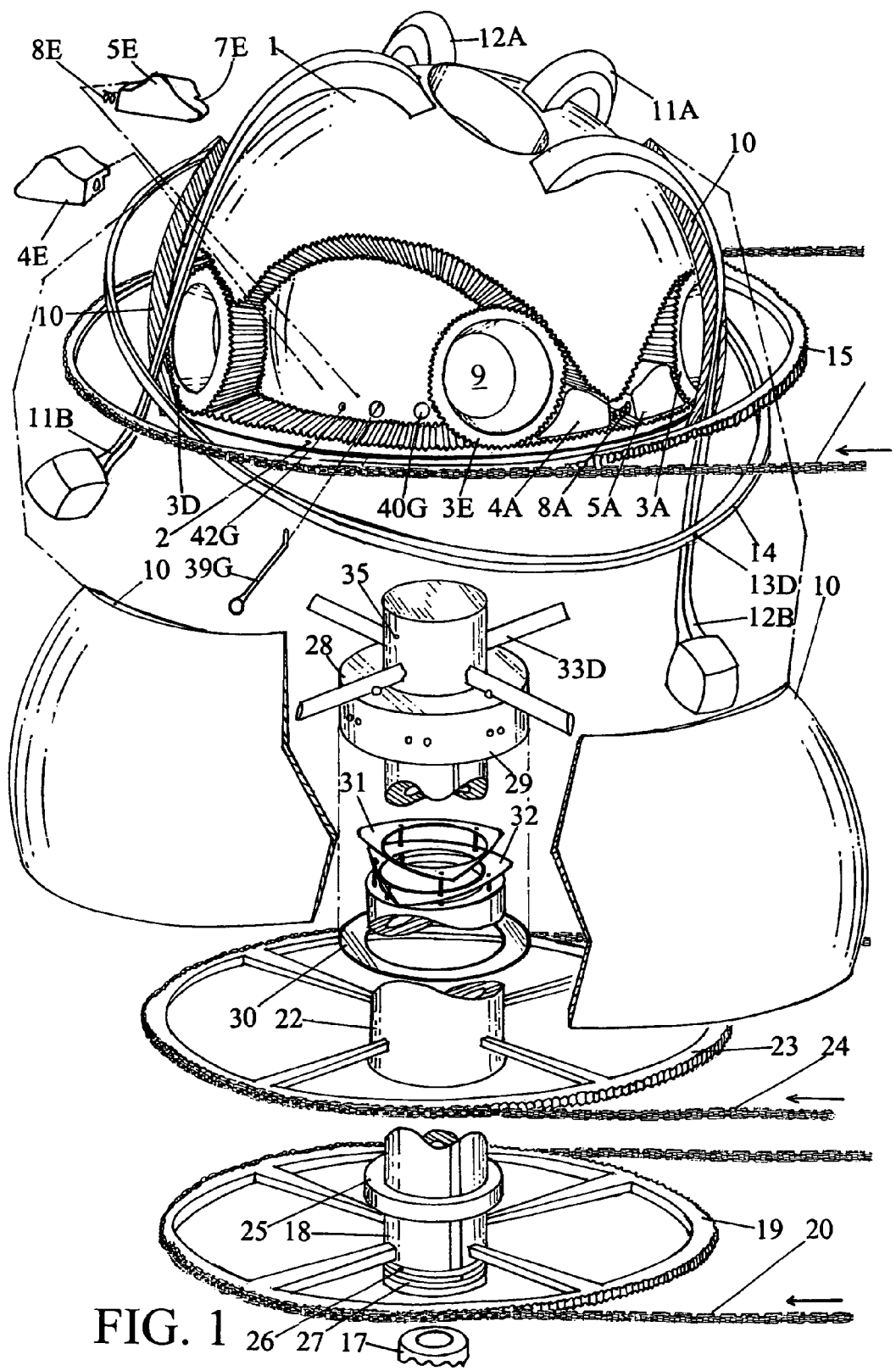
FIG. 1 is an exploded isometric view showing all of the systems except for the electrical, exhaust, and charge distribution systems.

1 Nutating Member
2 Rotator
3A-E Free Planetary Gears
4A-E "Butterfly" Left Wings
5A-E "Butterfly" Right Wings
6A-E "Butterfly" Left Wing Slots
7A-E "Butterfly" Right Wing Slots
8A-E "Butterfly" Springs (compressive)
9 Inner Spherical Cover
10 Outer Spherical Cover
11A, B Counterweights and Arms without Pivots
12A, B Counterweights and Arms with Pivots
13A-D Gimbal Pintles
14 Inner Gimbal Ring
15 Outer Gimbal Ring with Sprocket Gear
16 Gimbal Drive Chain
17 Fixed Shaft
18 Rotator Shaft
19 Rotator Shaft Sprocket Gear
20 Rotator Shaft Drive Chain
21 Support Lip for Rotator Shaft
22 Cam Shaft
23 Cam Shaft Sprocket Gear
24 Cam Shaft Drive Chain
25 Support Lip for Cam Shaft
26 Upper Slip Ring for Distributor
27 Lower Slip Ring for Distributor
28 Cam and Distributor Canister Top Cover
29 Cam and Distributor Canister Lateral Cover
30 Cam and Distributor Canister Bottom Cover
31 Intake Valve Cam
32 Exhaust Valve Cam
33A-D Spider Legs
34 Spinnable Seal
35 Charge Spiracle
36 Main Charge Distribution Hose
37A-G Atrial Distribution Hoses
38A-G Charge Atria
39A-G Intake Valve Heads and Pushrods
40A-G Exhaust Valve Heads and Pushrods
41A-N Valve Springs (compressive)
42A-G Spark Plugs
100-700 (by 100's) Schematic Valve and Spark Plug Stations
901 Nutating Member in Alternate Embodiment
902 Stator (only in Alternate Embodiment)
915 Outer Gimbal Ring with Sprocket Gear in Alternate Embodiment
916 Gimbal Drive Chain in Alternate Embodiment
917 Fixed Shaft in Alternate Embodiment
922 Cam Shaft in Alternate Embodiment
923 Cam Shaft Sprocket Gear in Alternate Embodiment
924 Cam Shaft Drive Chain in Alternate Embodiment
925 Support Lip for Cam Shaft in Alternate Embodiment
942 Spark Plug in Alternate Embodiment

DETAILED DESCRIPTION OF THE INVENTION

It is acknowledged at the outset that the description offered of the instant invention together with certain unavoidable philosophical digressions is far more complicated than its operation which is really no different than a rotary version of a four-stroke piston engine. On the other hand this complexity is completely canonical in the sense that it flows freely from the main engendering principle: to exploit as combustion chambers the varying volumes associated with a completely stress-free precessional process.

STATIC DESCRIPTION OF A PREFERRED EMBODIMENT

The composition of the engine divides itself naturally into two main assemblies: the spherical (in this preferred embodiment: upper) and the strictly rotating (in this preferred embodiment: lower).

As for the former, what immediately follows (see FIG. 1) takes place in the geometrical milieu located between the outside surface of an inner spherical cover 9 and the inside surface of an outer spherical cover 10 whence all other surfaces are ruled surfaces whose rulings originate at the sphere's center. So, for instance, the therein confined 5 identical free-planetary gears 3A-E are each defined not by a "pitch circle" but by a "pitch cone" the apex of which coincides with the center of the sphere. The actual surfaces of their teeth are similarly ruled. This applies exactly to a large substantially circular gear 2, the Rotator which is welded to the inner and outer spherical covers. And this applies to a 4-lobed (in this embodiment) gear 1, the Nutating Member.

Geometrical Digression

The Nutating Member is a novel structure. The pitch surface which demarcates it is called a polaricider. It is defined primarily almost tautologically as that curve which will roll without slipping over the pitch cone of a free-planetary gear, itself rolling without slipping over the pitch cone of the Rotator as the latter executes a perfect geometrical rotation and simultaneous precession relative to the Nutating Member. In particular the polaricider is a mathematical curve whose exact shape is predetermined by a specification of it five parameters discussed infra. Just the definition, however, induces on the polaricider a number of symmetries: Each projecting lobe must be identical to every other and must possess in itself perfect mirror symmetry. The same is true of each interjacent arch. Any Nutating Member can be gauged by the angle subtended at the sphere's center between the Nutating Member's pole (see FIG. 4) and the nadir of any one of its lobes. For our engineering purposes the polaricider must meet a second condition namely that its periodicity be such that self-intersections are precluded. A third is that the curvature at the apex of an arch be somewhat less than that of a free-planetary gear.

In that the free-planetary gears are indeed free and doubly engaged the polaricider bears relationship to neither a cycloid, nor any involute, evolute, nor any spherical analogue thereof.

By "rotation and simultaneous precession" is meant the lay notion of an object spinning uniformly about its symmetry axis as this axis uniformly rotates about a secondary (in this emodiment: verticle) axis (see FIGS. 4 and 5) rather than the more exacting notion of an object'instantaneous angular velocity $\vec{\omega}'$ (of constant magnitude $\omega'$) itself precessing about a fixed (in this embodiment:verticle) axis with angular velocity $\vec{\omega}$ (of constant magnitude $\omega$).

Any prospective machine which tightly spans the surface of the sphere may be specified by five freely chosen parameters. They are the subtended angles at the sphere's center of a free-planetary gear, the Rotator, and the Nutating Member; an integer parameter equal to the number of free-planetary gears; and a binary parameter + or −, indicating whether the Nutating Member possesses a number of lobes equal to one more or one less than the number of free-planetary gears. It is generally noted that the polaricider will both exist and be a uniquelly predetermined mathematical curve following a specification of these five parameters, as could be attested to by one skilled in the Art of Dynamic Systems.

Once the existence and uniqueness of the polaricider is apprehended it seems amazing that some number of free-planetary gears can be simultaneously entrained between the Rotator and the Nutating Member. Actually it is trivial: On the surface of the inner spherical cover entrain a single free-planetary gear with the Rotator and initially, say, the nadir of a lobe of the Nutating Member therewith tilting that lobe maximally away from the Rotator. Now let the entrainment run its course according to the design criterion. As subsequent lobes arrive at their maximal distance from the Rotator entrain yet another free-planetary gear. When all of the free-planetary gears have been so entrained the resulting configuration will be as in FIG. 4. Here we can think of the far left free-planetary gear which is in profile as possessing, relative to its engaged lobe, a phase equal to zero. The free-planetary gear to its right bears an absolutely symmetric position, relative to its engaged lobe, as the free-planetary gear which is occluded behind it. Its phase relative to its entrained lobe on the other hand should be thought of as equal but opposite to its occluded partner. Exactly the same two observations hold for the free-planetary gear visible on the far right. Equivalently, for this and all configurations, as their latitude is circumnavigated the phase lag of each free-planetary gear relative to the lobe's nadir subsequent to it (not necessarily the nadir of that lobe with which it is engaged) will uniformly increment.

Figures 5, 10:
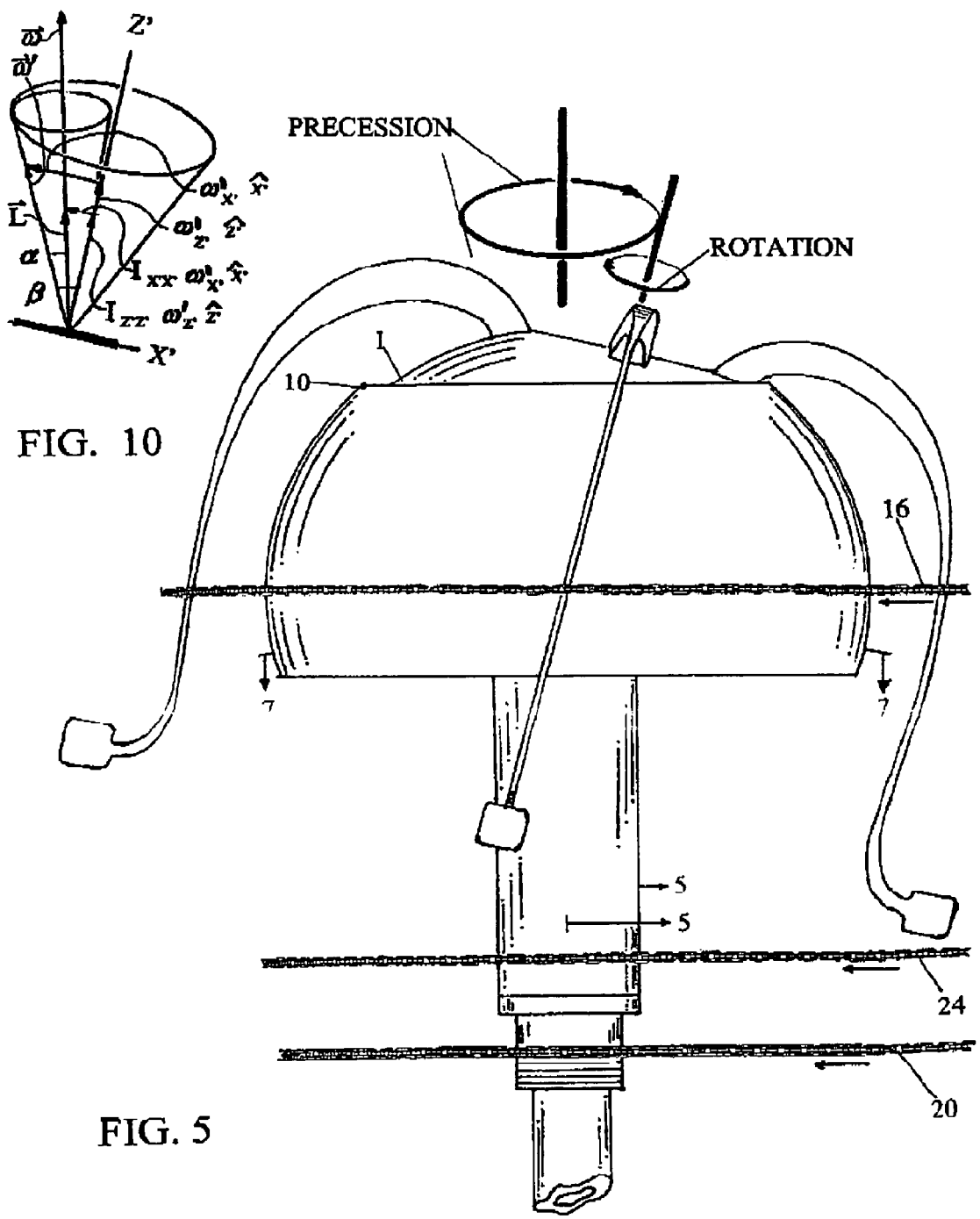
FIG. 5 is an elevation identical in orientation to FIG. 4 except with the spherical cover and drive chains replaced. Again, the curved arrows indicate the rotation and precession of the Nutating Member after submitting the entire engine to reverse-English.

This more exacting, less lay notion, is illustrated in FIG. 10. FIG. 10 depicts all of the parameters that specify a stress-free motion of a disk-like object at a small inclination angle. The primed coordinate system (x',z') is attatched to the body (and body cone) and is depicted at a moment of maximal declination. $I_{Z'Z'}$ and $I_{X'X'}$ are moments of inertia about the axis of symmetry and a perpendicular axis, respectively. $\vec{L}$ is the angular momentum. β and α are the half-apex angles of the (larger) body cone and the (smaller) inertial-space cone. The former rolls without slipping over the latter with instantaneous velocity $\vec{\omega}'$ which precesses about the vertical with angular velocity $\vec{\omega}$.

Two formulae are immediately apparrant:

$$\tan\beta = \omega'_{X'}/\omega'_{Z'} \text{ and } \tan(\beta-\alpha) = (I_{X'X'}\omega'_{X'})/(I_{Z'Z'}\omega'_{Z'})$$

By considerring the curvilinear speed of any point on the axis of the body cone it can be seen that $$\omega' \sin\beta = \omega \sin(\beta-\alpha)$$

These three formulae suffice to solve for any configuration. It is the third formula which is crucial in making obvious the claim that for a stress-free motion of a disk-like object at small inclination angles $\omega/\omega' \approx 2$. Therefore, the disk efficiency, e, is defined by $\omega/\omega' = 2e$.

An example will suffice to illustrate the role e plays in the design process: Suppose, in the preferred embodiment (angle of inclination $=\beta-\alpha=14$ degrees, see FIG. 10 in which all rotations and precessions are mirror-reversed for clarity) it is anticipated that the Nutating Member will conduct itself with the inertial characteristics of a U.S. penny while its rotatable linkage ratifies upon it a perfectly stress-free motion. Then, $$I_{X'X'} = [(1/4)(M(0.95 \text{ cm})(0.95 \text{ cm}) + (1/12)M(0.146 \text{ cm})(0.146 \text{ cm})]/(1/2)M(0.95 \text{ cm})(0.95 \text{ cm}) = [(1/4)(0.90) + (1/12)(0.02)]/(1/2)(0.90) = ((0.225 + 0.0017)/0.45 = 0.227/0.45 = 0.504$$

$$\tan(\beta-\alpha) = \tan(14 \text{ degrees}) = 0.2493, \omega'_{x'}/\omega'_{z'} = 0.2493/0.504 = 0.495 = \tan\beta, \beta = 26.32 \text{ degrees}, \alpha = 12.32 \text{ degrees}$$

finally, $\omega/\omega' = \sin\beta/\sin(\beta-\alpha) = 0.443/0.242 = 1.83 = 2e$, e=92% simply put, for a given spin rate, this Nutating Member will precess at 92% the rate it would have, had it been a perfectly flat disk at a vanishingly small angle of inclination.

Static Description (Cont.)

Thus far the physics of the Nutating Member is anything but stress-free. To achieve half that goal counterweight arms 11A, 11B, 12A, and 12B are affixed to the Nutating Member well free of the outer sphereical cover. Their primary function is to relocate the Member's center of mass to that of the sphere. This will result in the nullification of the Newtonian stress, i.e. no net force is necessary to direct the motion of the Nutating Member. Still, the rotational motion will be unnatural: For most reasonable configurations (but not all; see the alternate embodiment infra) the Nutating Member's precession will have the opposite sense as its rotation (see FIG. 4). This is precluded by Euler's analysis and it is this circumstance that necessitates the entire device be imparted with a reverse-English. Before turning to the rotating assembly it should be noted that a secondary function of the counterweights is to sculpt the Nutating Member's elipsoid of inertia to one more disk-like and less rod-like. This will result in the nullification of the Eulerian stress, i.e. no net torque is necessary to direct the motion of the Nutating Member. A third function of counterweight arms 12A and 12B is to cradle via gimbal pintles 13D and 13B an inner gimbal ring 14 which in turn cradles via gimbal pintles 13C and 13A an outer gimbal ring and sprocket gear 15 (see FIG. 1).

Figure 6:
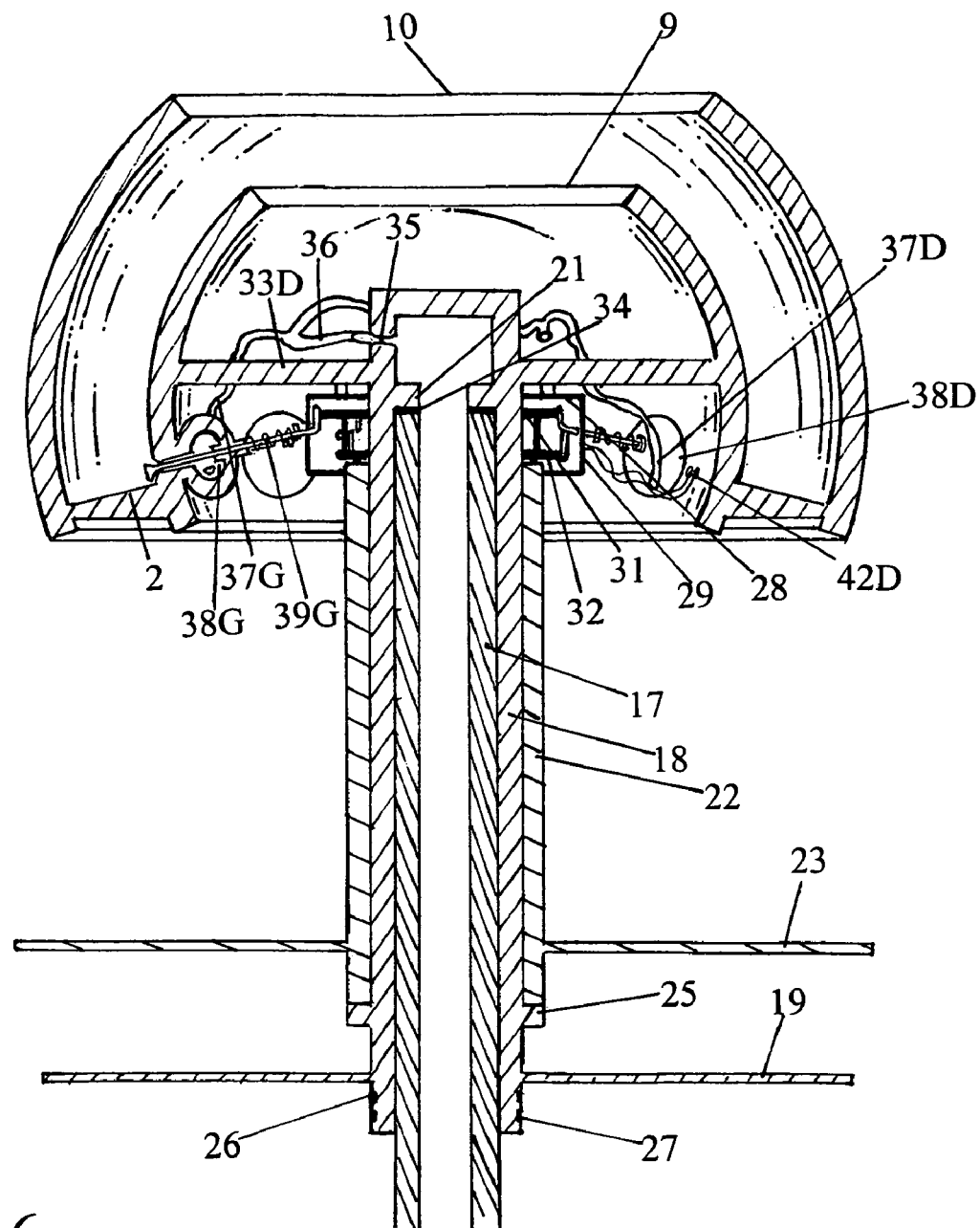
FIG. 6 is an orthogonal cutaway from FIG. 5 of the device excluding the Nutating Member, free-planetary gears, "butterflies", and drive chains.

The entire rotational assembly is built on three hollow concentric lumena (see FIG. 6). An innermost shaft 17 is stationary. Next out, a shaft 18 serves as axis for the Rotator to which it is attached via the inner spherical cover and ultimately struts or spider legs 33A-D which in turn support a top cannister cover 28. This along with a lateral cannister cover 29 and a bottom cannister cover 30 completely encloses the cam and distributor assembly. The Rotator shaft constrains the axis in three dimensional space, in this embodiment, of not just the Rotator but both the inner and outer spherical covers (not to mention the cam and distributer cannister).

Rotator shaft 18 is sustained upon stationary shaft 17 on an inward projecting lip 21 the lower surface of which comprises a seal 34 which in spite of its spinning prevents loss of charge as it passes up through stationary shaft 17 before exiting towards a combustion chamber via a spiracle 35. The Rotator shaft is is also affixed with a sprocket gear 19.

An outermost hollow shaft 22 governs the cams and distributor. Its lower region is affixed with a sprocket gear 23 and sustained upon Rotator shaft 18 on an outward projecting lip 25. Its upper region extends as far as the cam and distributor canister whose inner workings are responsible for exhausting, charging, and igniting the inter-planetary combustion chambers. Though electrical slip rings 26 and 27 are depicted at the base of the Rotator shaft, the electrical system including any cams and/or microprocessors that might be utilized in the ignition process is assumed to be a well understood art, reside completely within the confines of the canister and is completely suppressed from the drawings.

Figure 4:
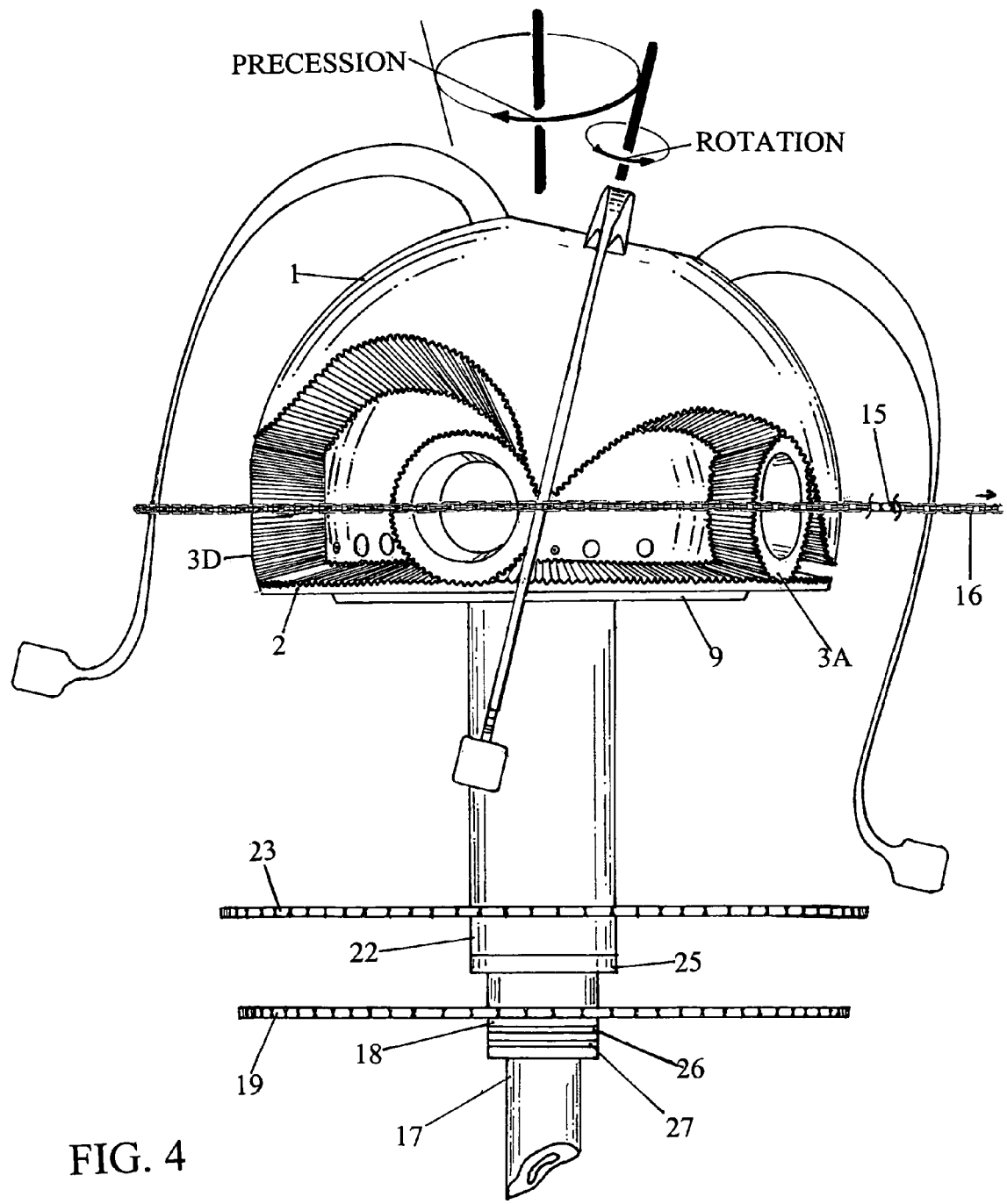
FIG. 4 is an external elevation with the spherical cover, the "butterflies", and two of the drive chains removed. Additionally, the curved arrows indicate the rotation as well as the precession of the Nutating Member under the condition of a stationary Rotator.

Although the rotation and simultaneous precession of the Nutating Member relative to the Rotator in FIG. 5 is precisely the same as in FIG. 4, as subjected to reverse-English the rotation and simultaneous precession depicted in FIG. 5 can be seen to approach, in three dimensional inertial space, a ratio of 1:2 as demanded by Euler for a disk-like object. To facillitate the reverse-English, the rotational rates of sprocket gears 15 and 19 must be held in strict ratio. The means by which their motion are conveyed, in this embodiment, are linkages in the form of drive chains 16 and 20 engaged with two sprocket gears on a common drive shaft (not shown). This is also the means by which torque and energy are conveyed from the engine. The cams and distributor are sychronized with a similar motion-conveying linkage embodied by sprocket gear 23, drive chain 24 and a third unseen sprocket gear on a common drive shaft. The relative diameters of all three sprocket gears 15, 19, and 23 are propotioned under the assumption that the three engaged unseen sprocket gears on the common drive shaft are of the same diameter as each other.

Figure 7:
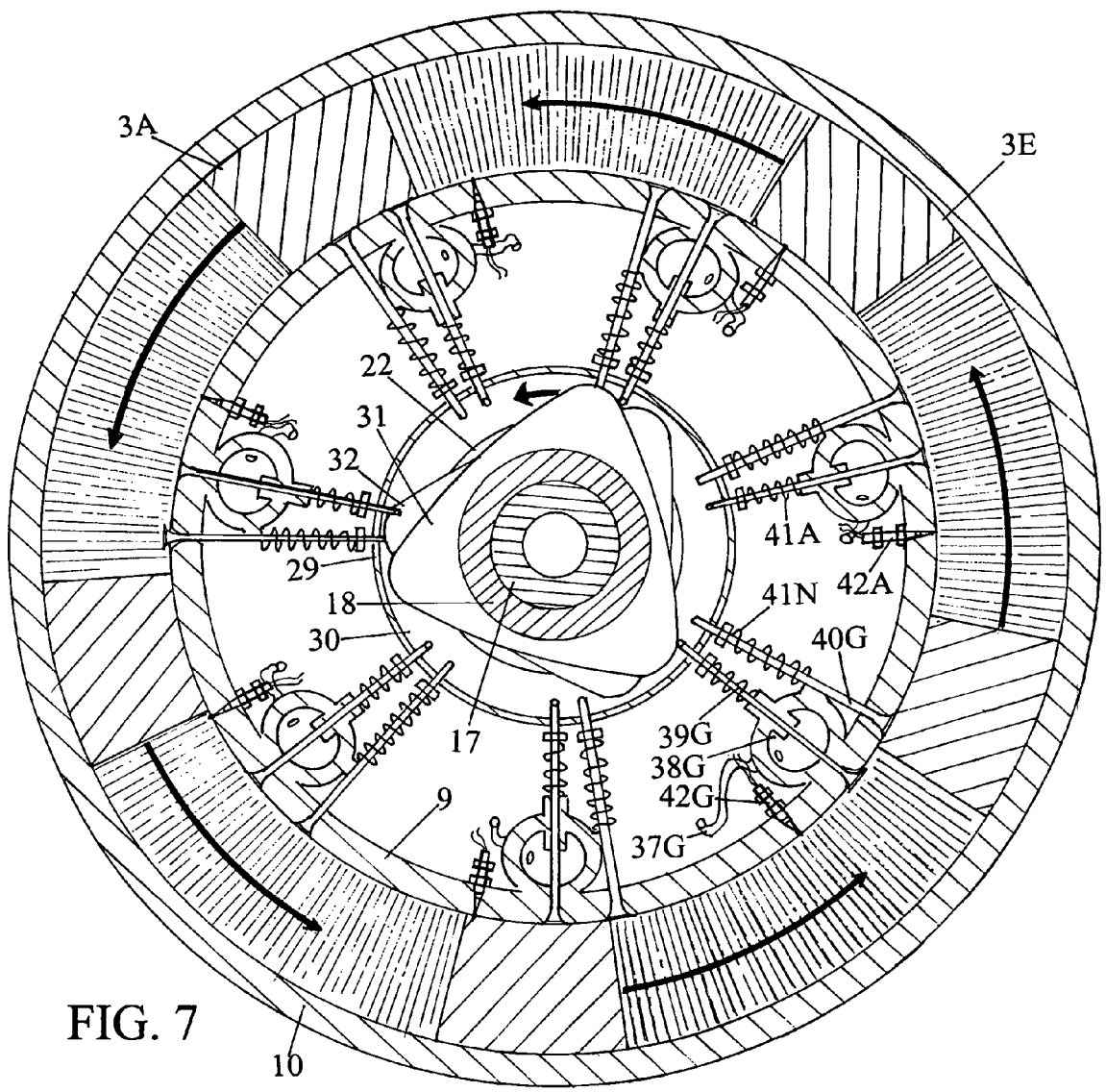
FIG. 7 is an overhead conical cutaway from FIG. 5 at the level of the pushrods. The pusbrods themselves, their springs, and the intake cam are not cutaway. The curved arrows indicate the motion of the free-planetary gears and the rotation of the cams relative to the spherical covers.

The only place place besides the common drive shaft where the two assemblies communicate with each other is via the components that oversee the functioning of any including the instant internal combustion engine. Hence, the top cam shaft 22 is affixed via struts to an exhaust valve cam 32 and this to an intake valve cam 31. Each cam shaft has a central circular cut-out to make way for Rotator shaft 18 which was previously described as affixed to the cannister with which it rotates. Turning to FIG. 7 the cannister has (in this embodiment) 14 bores to provide egress for 7 pushrods with exhaust valve heads 40A-G and 7 pushrods with intake valve heads 39A-G as well as certain devices (not shown, as previously mentioned) to actuate the means of ignition, in this embodiment, the 7 spark plugs 42A-G. The outer convex surface of all 14 valve heads are normally pulled flush with the outside surface of inner spherical cover 9 by their respective compressive springs 41A-N. Looking down upon these proceedings the charge exits spiracle 35 to a hose 36 then chooses one of 7 distribution hoses 37A-G and their corresponding atria 38A-G before being loaded into one of 5 inter-planetary volumes. These are the means by which the charge or fluid is controlled prior to compression and ignition.

Design Considerations

To reiterate: thus far each engine can be specified by five freely chosen parameters. They are the subtended angles at the sphere's center of a free-planetary gear, the Rotator, and the Nutating Member; the integer number of lobes; and the binary parameter + or –. In point of fact one of the three continuous parameters must be absorbed to facilitate the condition that the compression ratio be fixed at a relatively high value, i.e. that each lobe have approximately the same (though somewhat less) extent than a free-planetary gear. (see FIG. 1 and FIG. 4) Fullfilling this condition still yields two dimensions of parameters to finesse forth another relationship which, though not critical may yield certain benefits: By a judicious choice of the ratio of the total number of gear teeth possessed by the Nutating Member to the total number of gear teeth possessed by the Rotator a periodicity can be induced upon the latter vis-a-vis the locations of maximal compression of the inter-planetary volumes. In this embodiment the ratio was chosen as 8:7 and thereby the number of positions of maximal compression occurring around the Rotator was fixed at 7: only 7 stations of spark plug, exhaust valve, and intake valve are necessary (see FIG. 7). This fixing has certain advantages regarding the efficacy of the camming but a much greater relevance to the optimal placement of the sparkplugs, a process which in the history of automotive engineering has always proved to be most empirical.

Static Description (Cont.)

To further boost the compression ratio plugs can be optionally inserted into the inter-planetary volumes (see FIG. 1). The purpose of these plugs is to displace a fixed amount of deadvolume from both the maximal and minimal inter-planetary volumes. As the compression ratio is= (MAX-DEAD)/(MIN-DEAD) it is easily perceived that as the deadvolume approaches the minimal volume, the compression ratio can be appreciably increased; certainly to a level comparable to that of the modern internal combustion engine of approximately 10, i.e., to about one order of magnitude. These could easily be adorned with various friction reducing rollers or gears but in this embodiment are mere sliding components consisting of left "butterfly" wings 4A-E linked via compressive springs 8A-E to right "butterfly" wings 5A-E. It is important to note in so much as the "butterflies" reside within the inter-planetary volumes that their inside surfaces possess slots 6A-E, and 7A-E lest there be collision with the valve heads as they are sequentially actuated by their respective cams (see FIG. 3).

Operation

As promised the operation is trivial. As each inter-planetary volume becomes bounded (in this embodiment: from above) sequentially by a lobe, an arch, a lobe, an arch, and a lobe, that volume undergoes the familiar cycling of the four-stroke piston engine: intake, compression, power, and exhaust. It only remains to say with respect to the 5 inter-planetary volumes that successive, say, ignitions follow a pentagrammic pattern while with respect to the 7 spark plug stations the ignitions follow a less-tight septagrammic pattern. (I.e., if I may hearken back to high school: not the more-tight septagrammic pattern of successive multiples of 3 modulo 7, but the less-tight septagrammic pattern of successive multiples of 2 modulo 7; or equivalently, successive multiples of 200 modulo 700.) In other words, in this embodiment the ignition is completely even-tempered with respect to both the inter-planetary volumes and the spark plug stations.

Figure 8:
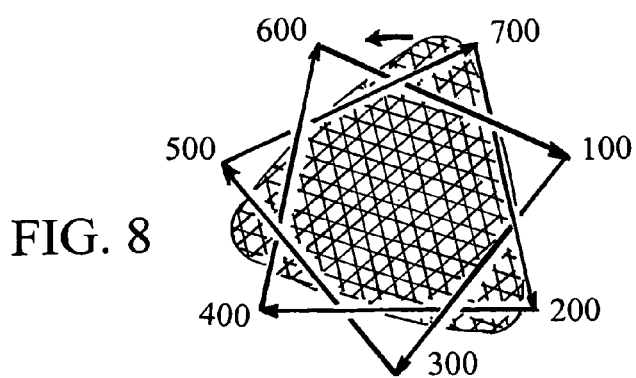
FIG. 8 is a highly schematicized depiction of the intake cam indicating the less-tight septagranimic intake regimen. The curved arrow indicates the rotation of the cam relative to the spherical covers.

It is somewhat amazing that this latter regimen can be effected with just a three-pointed cam but consultation with the highly schematicized FIG. 8 will allay all doubts.

DESCRIPTION AND OPERATION OF ONE ALTERNATE EMBODIMENT

Figure 9:
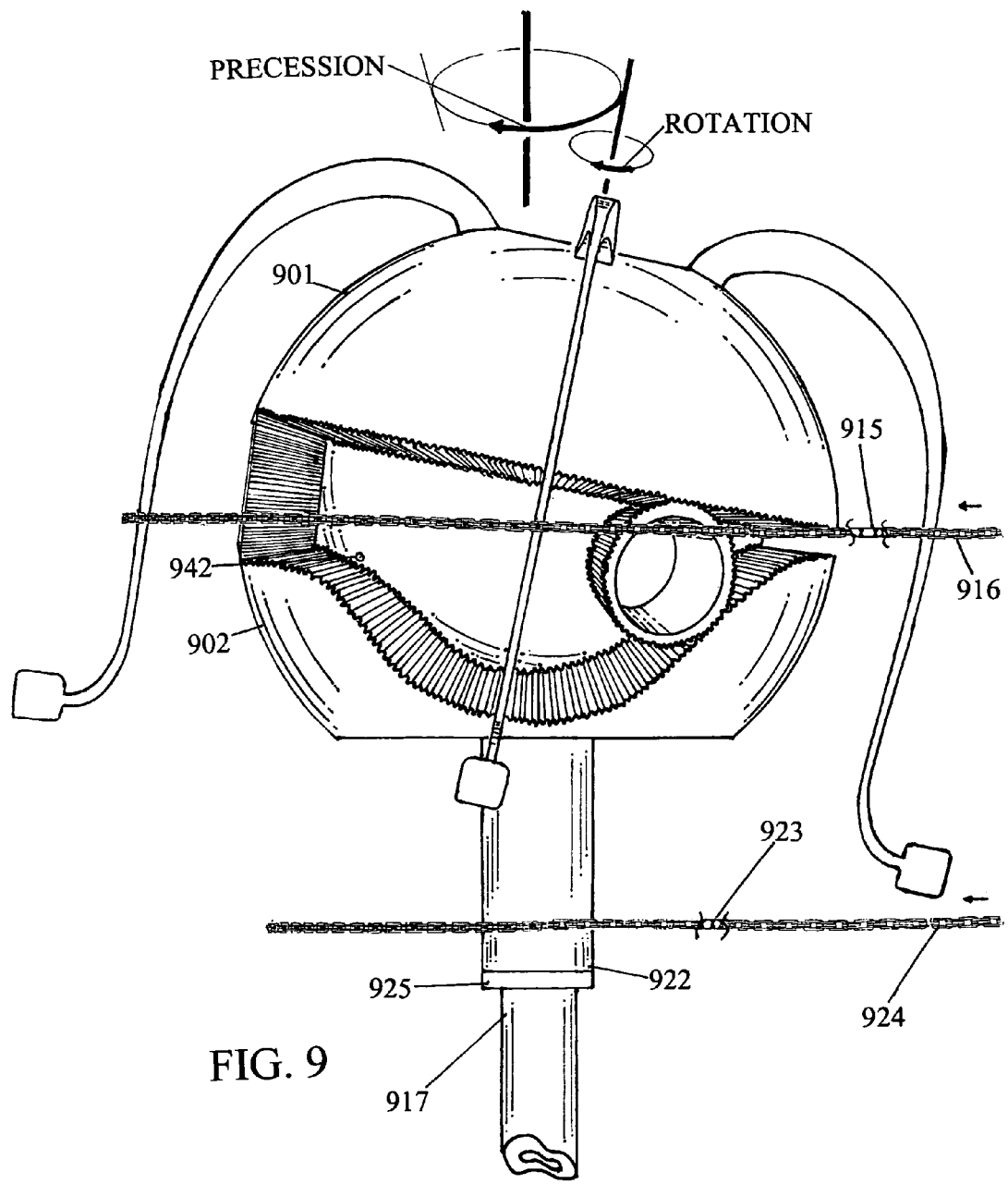
FIG. 9 is an external elevation of an alternate embodiment with the spherical cover and the (inverted) "butterflies" removed. The curved arrows indicate the rotation and precession of the FIG. 10 is a highly schematized depiction of a disk-like object spinning and simultaneously precessing at a small angle of inclination.

As will be posited in the succeeding section there are numerous variations that can be played on this preferred theme. One alternate embodiment which simultaneously incorporates several of these is for the two main gear elements to take each other's place:

In FIG. 9 it is seen that the Nutating Member, 901, has been rendered substantially circular while what had been the Rotator, now a stator, 902, has been endowed with lobes. The number of these lobes has been altered from 4 to 2, the number of free-planetary gears reduced from 5 to 3 while their general latitude has been made less equatorial and more polar. This latter variation admits to some alteration in the ratio of the total number of teeth of the lobed element to the total number of teeth of the substantially circular element. The upshot of these modifications is that the Nutating Member will execute stress-free rotations and simultaneous precessions absent any application of reverse-English. That is, if properly counterweighted, the now substantially circular Nutating Member will execute Eulerian motion relative to a stationary lobed element. This may have certain advantages. For instance, the spinable seal may be dispensed with. Another is that only one sparkplug, 942, one intake valve head and one exhaust valve head arraigned about the inside spherical cover, welded now to the lobed element, are required. An outer gimbal ring with sprocket gear, 915, a gimbal ring drive chain, 916, a fixed shaft, 917, a somewhat skinnier cam shaft, 922, a cam shaft sprocket gear, 923, a cam shaft drive chain, 924, and a somewhat skinnier support lip, 925, for the cam shaft have completely analogous functions.

Additional Scope

There are many variations that may prove advantageous. One, in the realm of hydro- or especially aero-dynamics, is that instead of conveying torque to a common remote drive shaft that there might be certain advantages in affixing a propeller or an impeller directly to the Nutating Member. Another is that the previously mentioned ratio of rotations of the Nutating Member and the Rotator Shaft (not to mention the Cam Shaft) should not be thought to be constrained to non-zero and non-infinite values: Certainly one or more may be frozen with respect to the engine's reference frame. Indeed, this was the case of the "Rotator" in the alternate embodiment.

Furthermore, the means by which this ratio is held fixed need not be sprocket gears linked to a common drive shaft. Various pinion gears, conical gears, belts, and such could easily be substituted.

In addition it might be, as in the case of the modern bicycle, that certain advantages may be reaped in certain departures from perfect roundness in regards to the sprocket gears. This may also be true of the free-planetary gears especially if coordinated with some periodicity as they traverse around the Nutating Member and substantially circular Rotator. Even the latter might absorb some of the precessional duties by assuming a lobedness. In this case, the second number of lobes will be determined by a second freely chosen binary parameter + or − and might not be equal to the number of lobes on the lobed Nutating Member. However, both numbers must be different by unity to the number of free-planetary gears. In this case both polariciders will be uniquely mathematically predetermined curves as could be attested to by one skilled in the Art of Dynamic Systems. (Or, as in the case of the alternative embodiment, the Nutating Element may be unlobed.)

There are an infinitude of variations possible so the essence of the instant invention must be attributed to not the two embodiments nor these recent musings but strictly to the claims.

I claim:

1. A rotary displacement device having a housing, said housing comprising:

an outer spherical cover, an inner generally spherical surface disposed therein, having a spherical center and an inner spherical cover, an outer generally spherical surface disposed thereout, sharing said spherical center, a predetermined number of identical substantially circular free-planetary gears snugly disposed thereof between said inner and said outer spherical covers possessing a plurality of teeth, said teeth defined by a pitch cone, said pitch cone possessing an apex coinciding with said spherical center, a first large gear snugly disposed thereof between said inner and said outer spherical covers and possessing a plurality of teeth, said teeth of said first large gear possessing surfaces proportioned to tightly mesh with said teeth of said free-planetary gears, and arranged about a first pitch surface, said first pitch surface ruled to said spherical center and further possessing a first number of lobes freely selected from a group consisting of one more than said number of free-planetary gears and one less than said number of said free-planetary gears, said first pitch surface being more precisely defined by a first predetermined mathematical curve, a second large gear snugly disposed thereof between said inner and said outer spherical covers and possessing a plurality of teeth, said teeth of said second large gear possessing surfaces proportioned to tightly mesh with said teeth of said free-planetary gears, and arranged about a second pitch surface, said second pitch surface ruled to said spherical center and further possessing a second number of lobes freely selected from a group consisting of zero,
and
one more than said number of said free-planetary gears, and one less than said number of said free-planetary gears,
said second pitch surface being more precisely defined by a second pre-determined mathematical curve,
said first and said second predetermined mathematical curves chosen in such a way as to enjoin said first large gear to execute precessional rotation relative to said second large gear when said first and said second large gears are entrained with said predetermined number of said free-planetary gears,
axis-constraining means by which the rotation of at least one of said outer spherical cover, said inner spherical cover, said first large gear, and said second large gear be substantially constrained to a fixed axis in three dimensional space.

2. A nutating engine having a housing, said housing comprising:
an outer spherical cover, an inner generally spherical surface disposed therein, having a spherical center and
an inner spherical cover, an outer generally spherical surface disposed thereout, sharing said spherical center,
a predetermined number of identical substantially circular free-planetary gears snugly disposed thereof between said inner and said outer spherical covers possessing a plurality of teeth, said teeth defined by a pitch cone, said pitch cone possessing an apex coinciding with said spherical center,
a first large gear snugly disposed thereof between said inner and said outer spherical covers and possessing a plurality of teeth, said teeth of said first large gear possessing surfaces proportioned to tightly mesh with said teeth of said free-planetary gears, and arranged about a first pitch surface, said first pitch surface ruled to said spherical center and further possessing a first number of lobes freely selected from a group consisting of
one more than said number of free-planetary gears
and
one less than said number of said free-planetary gears,
said first pitch surface being more precisely defined by a first predetermined mathematical curve,
a second large gear snugly disposed thereof between said inner and said outer spherical covers and possessing a plurality of teeth, said teeth of said second large gear possessing surfaces proportioned to tightly mesh with said teeth of said free-planetary gears, and arranged about a second pitch surface, said second pitch surface ruled to said spherical center and further possessing a second number of lobes freely selected from a group consisting of
zero,
and
one more than said number of said free-planetary gears, and one less than said number of said free-planetary gears,
said second pitch surface being more precisely defined by a second pre-determined mathematical curve,
said first and said second predetermined mathematical curves chosen in such a way as to enjoin said first large gear to execute precessional rotation relative to said second large gear when said first and said second large gears are entrained with said predetermined number of said free-planetary gears,
axis-constraining means by which the rotation of at least one of said outer spherical cover, said inner spherical cover, said first large gear, and said second large gear be substantially constrained to a fixed axis in three dimensional space,
fluid-controlling means by which the chambers bounded by said inner spherical cover, said outer spherical cover, said first large gear, said second large gear, and two consecutive of said free-planetary gears be loaded with air/fuel admixture and subsequently exhausted of combusted same said air/fuel admixture with the temporal variations in volume of said chambers,
ignition means by which said air/fuel admixture be ignited occurring at the moment of substantial minimal volume of said chambers,
motion-conveying means by which the rates of rotation of said first large gear and said second large gear be substantially held at some pre-determined ratio, said predetermined ratio altering in inertial space for any said large gear whose axis is not constrained in three dimensional space, the angular velocity ratio $\omega/\omega'$ so that $\omega/\omega' \approx 2e$, where $\omega'$ represents the magnitude of the instantaneous angular velocity $\vec{\omega}'$ of said large gear and $\omega$ represents the magnitude of the angular velocity $\vec{\omega}$ of precession of $\vec{\omega}'$ in inertial space and e is the efficiency with which said Nutating Member is comported in the inertial characteristics of an ideal disk at a vanishingly small angle of inclination.

3. The nutating engine of claim 2 further including physical protuberances affixed to at least one of said large gears providing to the affixed gear an effect selected from a group consisting of relocating the center of mass of said affixed gear to the spherical center in such a way as to render said precessional rotation of said affixed large gear substantially free of Newtonian stress
and
altering the ellipsoid of inertia of said affixed large gear in such a way as to render said precessional rotation of said affixed large gear substantially free of Eulerian stress
and
both relocating the center of mass of said affixed large gear to the spherical center and concurrently altering the ellipsoid of inertia of said affixed large gear in such a way as to render said precessional rotation of said affixed large gear substantially stress-free.

4. The nutating engine of claim 3 wherein said fluid-controlling means synchronously loading and exhausting said temporally varying volumes of said chambers include at least one rotatably mounted cam.

5. The nutating engine of claim 4 further including certain volume displacing plugs, each disposed thereof in one of said chambers and so configured so as to substantially interfere with neither said fluid-controlling means nor said ignition means whereby the ratio of substantially maximal volume of said one of said chambers less volume of said plug to substantially minimal volume of said one of said chambers less volume of said plug be increased to one order of magnitude.

6. The nutating engine of claim 5 wherein said motion-conveying means by which said rate of rotation of said first large gear and said rate of rotation of said second large gear are held at a predetermined ratio comprise a motion-conveying linkage to a common drive-shaft to which torque and energy are urged.

7. The nutating engine of claim 6 further including a motion-conveying linkage between at least one said rotatably mounted cam and said common driveshaft.

8. The nutating engine of claim 5 further including a motion-conveying linkage between at least one said rotatably mounted cam and said common driveshaft.

9. The nutating engine of claim 4 wherein said motion-conveying means by which said rate of rotation of said first large gear and said rate of rotation of said second large gear are held at a predetermined ratio comprise a motion-conveying linkage to a common drive-shaft to which torque and energy are urged.

10. The nutating engine of claim 9 further including a motion-conveying linkage between at least one said rotatably mounted cam and said common driveshaft.

11. The nutating engine of claim 3 further including certain volume displacing plugs, each disposed thereof in one of said chambers and so configured so as to substantially interfere with neither said fluid-controlling means nor said ignition means whereby the ratio of substantially maximal volume of said one of said chambers less volume of said plug to substantially minimal volume of said one of said chambers less volume of said plug be increased to one order of magnitude.

12. The nutating engine of claim 11 wherein said motion-conveying means by which said rate of rotation of said first large gear and said rate of rotation of said second large gear are held at a predetermined ratio comprise a motion-conveying linkage to a common drive-shaft to which torque and energy are urged.

13. The nutating engine of claim 3 wherein said motion-conveying means by which said rate of rotation of said first large gear and said rate of rotation of said second large gear are held at a predetermined ratio comprise a motion-conveying linkage to a common drive-shaft to which torque and energy are urged.

14. The nutating engine of claim 2 wherein said fluid-controlling means synchronously loading and exhausting said temporally varying volumes of said chambers include at least one rotatably mounted cam.

15. The nutating engine of claim 14 further including certain volume displacing plugs, each disposed thereof in one of said chambers and so configured so as to substantially interfere with neither said fluid-controlling means nor said ignition means whereby the ratio of substantially maximal volume of said one of said chambers less volume of said plug to substantially minimal volume of said one of said chamber chambers less volume of said plug be increased to one order of magnitude.

16. The nutating engine of claim 15 wherein said motion-conveying means by which said rate of rotation of said first large gear and said rate of rotation of said second large gear are held at a predetermined ratio comprise a motion-conveying linkage to a common drive-shaft to which torque and energy are urged.

17. The nutating engine of claim 14 wherein said motion-conveying means by which said rate of rotation of said first large gear and said rate of rotation of said second large gear are held at a predetermined ratio comprise a motion-conveying linkage to a common drive-shaft to which torque and energy are urged.

18. The nutating engine of claim 2 further including certain volume displacing plugs, each disposed thereof in one of said chambers and so configured so as to substantially interfere with neither said fluid-controlling means nor said ignition means whereby the ratio of substantially maximal volume of said one of said chambers less volume of said plug to substantially minimal volume of said one of said chambers less volume of said plug be increased to one order of magnitude.

19. The nutating engine of claim 18 wherein said motion-conveying means by which said rate of rotation of said first large gear and said rate of rotation of said second large gear are held at a predetermined ratio comprise a motion-conveying linkage to a common drive-shaft to which torque and energy are urged.

20. The nutating engine of claim 2 wherein said motion-conveying means by which said rate of rotation of said first large gear and said rate of rotation of said second large gear are held at a predetermined ratio comprise a motion-conveying linkage to a common drive-shaft to which torque and energy are urged.

* * * * *